United States Patent [19]

Knothe et al.

[11] Patent Number: 4,625,818
[45] Date of Patent: Dec. 2, 1986

[54] ELECTRIC BALANCE

[75] Inventors: Erich Knothe, Bovenden; Franz-Josef Melcher, Hardegsen; Christoph Berg, Adelebsen, all of Fed. Rep. of Germany

[73] Assignee: Sartorius GmbH, Fed. Rep. of Germany

[21] Appl. No.: 712,763

[22] Filed: Mar. 18, 1985

[30] Foreign Application Priority Data

Mar. 19, 1984 [DE] Fed. Rep. of Germany ....... 3409998

[51] Int. Cl.$^4$ ................................................ G01G 7/00
[52] U.S. Cl. .............................. 177/212; 177/210 EM
[58] Field of Search ........................ 177/212, 210 EM

[56] References Cited

U.S. PATENT DOCUMENTS 4,189,017 2/1980 Strobel et al. ...................... 177/212
4,494,620 1/1985 Knothe et al. ................... 177/212 X Primary Examiner—George H. Miller, Jr.
Attorney, Agent, or Firm—Eric P. Schellin

[57] ABSTRACT

The invention suggests an intermittent mode of operation to reduce the stray power in the coil in a balance based on the principle of the electromagnetic compensation of force. To this end, switching means (21) are provided which can interrupt the current flow through the coil (11) so that when the current flow is interrupted, the movable parts (2–9) of the balance move against one of the stops (24) or (25). These switching means (21) are controlled by the digital signal processing unit (18). In addition storage means (20) are provided within the framework of the digital signal processing unit which store the last-determined weight value for the duration of the interruption of the current flow through the coil.

8 Claims, 2 Drawing Figures

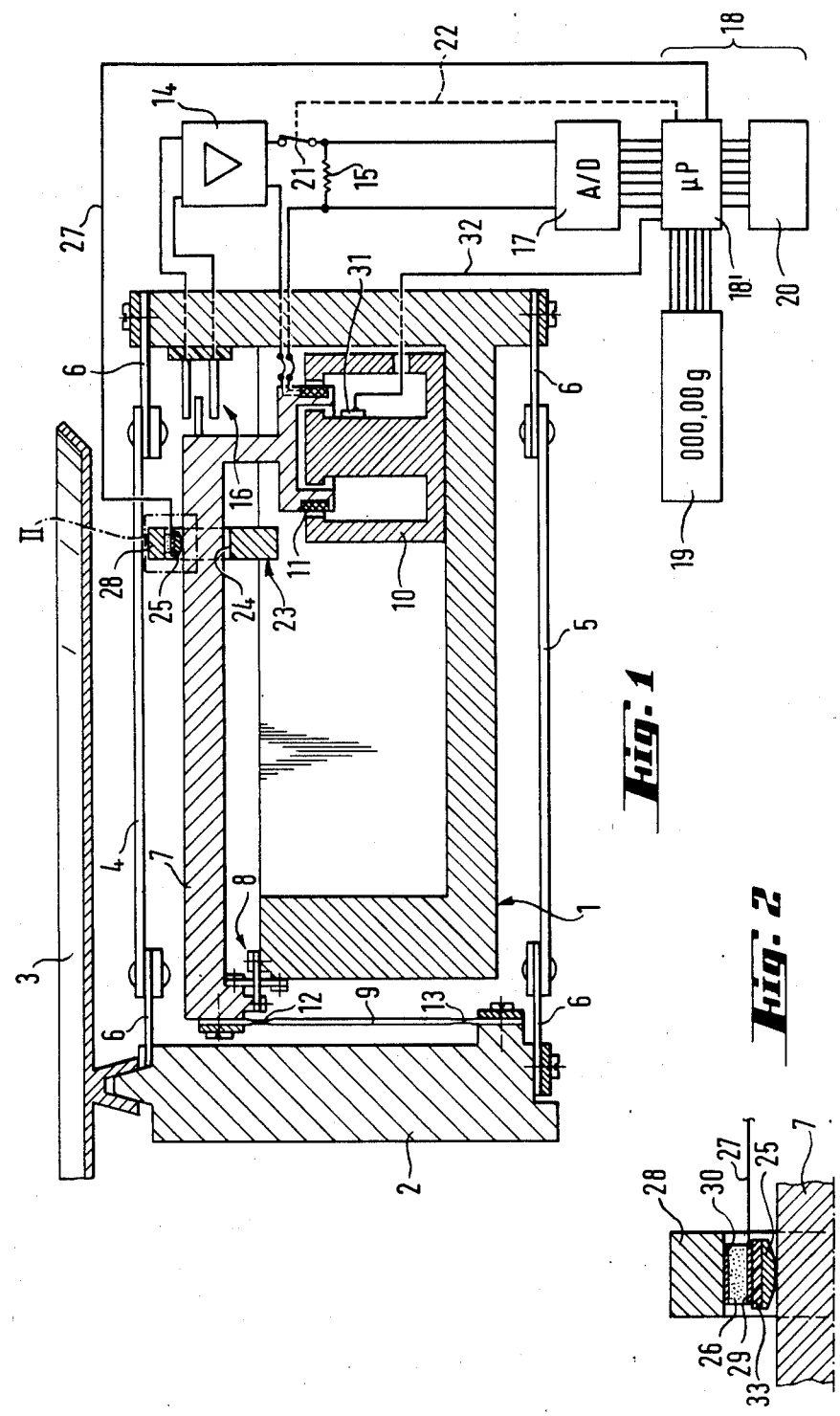

ELECTRIC BALANCE

BACKGROUND OF THE INVENTION

The invention is related to a balance based on the principle of the electromagnetic compensation of force having a balance scale and a balance scale carrier. The balance scale carrier can move vertically, e.g. by means of two rods of a parallel guide and is connected to a support part integral with the housing. Stops limited the movement of the balance scale carrier in a vertical direction with. A permanent magnet, and a current-carrying coil, which is located in the air gap of the permanent magnet, generate a weight-proportional counterforce. A control circuit regulates the current through the coil by a digital signal processing unit.

Balances of this type are well known. There are variations in which the control circuit permits a load-dependent direct current to flow through the coil, as is described, for example, in DE-GM 82 30 865.9, and also variations in which the control circuit sends high-frequency current impulses with load-dependent width or with load-dependent repetition rate through the coil, as is described, for example, in DE-PS 11 94 167.

A disadvantage of these known constructions is the fact that the current flow through the coil heats up the measuring system, which is particularly noticeable under rather heavy loads. This heating limits the counterforce which can be electrically generated at a given size of the permanent magnet.

Furthermore, DE-OS 20 38 214 teaches that a suspended balance scale can be set on a scale brake by briefly weakening the compensation current in order to stop an oscillation of the balance scale. This measure, introduced to dampen oscillation, does not result in any appreciable reduction of the electric stray power; in addition, a false weight is displayed during the braking of the scales. This invention has the task of reducing the electric stray power of the force-compensating system at the same carrying force and to increase the carrying force at the same electric stray power.

SUMMARY

The invention achieves this task as follows: In a balance of the type described above switching means are provided which can interrupt the current flow through the coil so that when the current flow is interrupted, the movable parts of the balance move against one of the stops. The switching means are controlled by the digital signal processing unit and storage means are provided within the framework of the digital signal processing unit which store the last-determined weight value for the duration of the interruption of the current flow through the coil.

In contrast to the customary balances, in which the control circuit of the electromagnetic compensation of force constantly assures an equilibrium of force—in the construction with current impulses through the coil in the formation of the average value in time by the inert mass of the movable parts of this balance—the invention provides that the electromagnetic compensation of force is operated only briefly, e.g., for one second, and is then put out of operation for a while. The duration of the interruption is considerably longer than the reaction time of the balance, so that the movable parts move against one of the stops in accordance with their distribution of mass.

It is advantageous if the pulse-duty factor, i.e., the time during which the electromagnetic compensation of force is operated, is made shorter than one in relation to the time during which the electromagnetic compensation of force is interrupted, in order to reduce the average stray power by at least one half. In one embodiment the pulse-duty factor is preferably selected to be approximately 0.1, which causes the average stray power to drop back to approximately 10%.

In another embodiment the pulse-duty factor is controlled by the signal processing unit as a function of the load: At a low load on the balance scale the pulse-duty factor is selected to be somewhat less than one, for example, and at a rather large load it decreases to 0.1. This considerably reduces the load dependency of the electric stray power.

In a third embodiment the power-duty factor is controlled as a function of the output signal of a temperature sensor on the coil or on the permanent magnet: At a slight supertemperature at the location of the temperature sensor a pulse-duty factor of approximately one is selected, while at a rather large supertemperature the pulse-duty factor is gradually reduced to 0.1. This achieves a stabilization of the temperature of the measuring system. In addition, if the balance is not used very often or in the case of small loads an almost continuous operation is achieved, the pulse-duty factor is not reduced until rather large loads and a rather long dwell time on the balance scale as a result of the greater supertemperature which arises.

In addition, the digital signal processing unit can advantageously determine the time during which the control circuit is operated according to a standstill criterium. The digital signal processing unit determines the standstill of the balance by comparing successive measuring results from the measuring system which are taken, for example, every 20 or 100 ms into the digital signal processing unit and then interrupts the control circuit.

It is advantageous if the distribution of the mass of the movable parts of the balance is selected so that they always lie against the same stop without the electromagnetic force on the coil—that is, independently of the load on the balance scale. Then, when the compensation of force is cut in, the balance always pivots from the same direction into its position of transient oscillation, which results in a better reproducing capacity.

It is also advantageous if this stop is supported via a force-sensitive element on the housing. Significant changes of load in the rest phase, that is, when the electromagnetic compensation of force is interrupted, can be detected in this manner and can cut in the control circuit.

The force-sensitive element can be a piezoelement, for example. These elements have the advantage that the signal from constant initial loads can be readily made zero by short-circuiting the element and then only changes in load bring about an output signal.

DESCRIPTION OF THE DRAWINGS

The invention is described below with reference made to the schematic drawings.

FIG. 1 shows a section through the measuring system of an electric balance based on the principle of the electromagnetic compensation of force.

FIG. 2 shows a stop in the measuring system of FIG. 1 on an enlarged scale.

DETAILED DESCRIPTION

The electric balance of FIG. 1 consists of support part 1 fixed permanently to the housing. Scale carrier 2 is fastened to this support part via two rods 4 and 5 with articulations 6 in a vertically movable manner. Scale carrier 2 carries load scale 3 at its top for receiving the material to be weighed and transmits the force corresponding to the mass of the material to be weighed via coupling element 9 with thin areas 12 and 13 onto the shorter lever arm of translation lever 7. Translation lever 7 is mounted on support part 1 via flexural pivot 8. The compensation force, which is generated by current-carrying coil 11 in the air gap of permanent magnet 10, attacks the longer lever arm of translation lever 7. The magnitude of the compensation current is regulated in a known manner by position sensor 16 and controlled-gain amplifier 14 in such a way with switch 21 closed, that there is equilibrium between the weight of the material to be weighed and the electromagnetic compensation force. The compensation force generates a measuring voltage on precision resistor 15 which is supplied to the highly resistant input of digitizer 17. The digitized result is taken over by digital signal processing unit 18 and displayed in display unit 19. Stops 24 and 25 can be recognized which are fastened by means of cross traverse 23 to support part 1 fixed to the housing and which limit the upward and downward travel of translation lever 7 and therewith also the upward and downward travel of scale carrier 2.

Microprocessor 18' of digital signal processing unit 18 controls switch 21 via lead 22. Before switch 21 opens, the last measured value displayed is first taken into store 20, so that this value can be displayed without change in display 19 during the time in which switch 21 is open. When switch 21 is opened, the current through coil 11 is interupted and the coil no longer produces any compensation force. The mass ratios of movable parts 2 to 9 and the translation ratio of translation lever 7 are selected so that translation lever 7 lies against upper stop 25 even without a load on balance scale 3. When there is a load on balance scale 3, it makes firm contact with this stop 25.

After the time set by microprocessor 18' for the open position of switch 21 has elapsed, it is closed again, therewith putting the control circuit back into operation. Movable parts 2 to 9 of the balance pivot back into their position of transient oscillation set by position sensor 16 and digitizer 17 continuously supplies measured values to digital signal processing unit 18. It checks successive measured values for uniformity and as soon as this is the case (standstill of the balance), this measured value is passed on to display 19 and is displayed instead of the previously displayed value for store 20. A new interruption cycle, as was described above, can now begin. The time during which switch 21 remains closed is either permanently set in microprocessor 18', e.g., at one second, whereby this permanently set time must naturally suffice for achieving a standstill of the balance. However, it is advantageous if microprocessor 18' takes the measured value into store 20 too and opens switch 21 again immediately after the standstill of the balance. This embodiment achieves the shortest possible cut-in time for the compensation current through coil 11 and therewith the smallest average stray power.

The time during which switch 21 remains open can either be permanently set by the program in microprocessor 18', or this time is set by microprocessor 18' as a fixed multiple of the cut-in time of switch 21 (fixed pulse-duty factor). However, two embodiments are preferred in which either the open time of switch 21 (and therewith the pulse-duty factor) is controlled by microprocessor 18' as a function of the load, whereby switch 21 is closed again after a rather brief period at small loads, while it remains open longer at large loads; or, microprocessor 18' controls the open time of switch 21 as a function of the output signal of temperature sensor 31: switch 21 is closed again after a rather brief period at a low supertemperature, while it remain open longer at a high supertemperature. To this end, temperature sensor 31 is fastened in a general heat-conducting manner to permanent magnet 10 in FIG. 1, which signals the temperature of permanent magnet 10 to microprocessor 18' via lead 32.

Both preferred embodiments have the result, in addition to a decrease of the average stray power, that the change of the stray power as a function of the load on balance scale 3 is less without additional measures than is the case in state-of-the-art balances. It is also possible in both embodiments that microprocessor 18' of digital signal processing unit 18 leaves the switch constantly closed until a certain supertemperature or temperature sensor 31 and does not cut in the intermittent mode of operation until the limits have been exceeded.

In an extended embodiment microprocessor 18' also takes into account during the determination of the open time of switches 21 whether the values stored in storage area 20 in successive open times of switch 21 were equal or differed only slightly or whether they differed sharply. In the first instance the next open time of switch 21 is made somewhat longer and in the second instance somewhat shorter.

It is of course possible to select other construction elements or arrangements than those in FIG. 1. For example, instead of being a mechanical relay, switch 21 can be a FET switch or a switching transistor. Likewise, switch 21 can be located at another position within the control circuit, for example, within controlled gain amplifier 14 or adjacent to the current supply to controlled gain amplifier 14. The essential feature is that the current through coil 11 can be interrupted therewith. Likewise, temperature sensor 31 can be fastened to another position on permanent magnet 10 or also to coil 11 without this changing its method of operation.

FIG. 2 shows a preferred embodiment of stop 25 once again on an enlarged scale. As has already been explained, when the current flow through coil 11 is interrupted, translation lever 7 comes to lie against upper stop 25. This stop 25 is supported in accordance with FIG. 2 via disk 26 consisting of a piezoelectric material against upper part 28 fixed to the housing. Piezoelectric disk 26 is provided on the top with metal electrode 29 and on the bottom with metal electrode 30, whereby the one metal electrode 30 is conductively connected to housing 1 and the other metal electrode 29 is insulated by insulating layer 33 and is connected via lead 27 to microprocessor 18' of digital signal processing unit 18. Piezoelectric disk 26 generates a charge on its electrodes in a known manner under a load. When switch 21 is opened, microprocessor 18' grounds lead 27, so that the amount of charge created when translation lever 7 rests against stop 25 is short-circuited. After the click of translation lever 7 against stop 27 fades away, microprocessor 18' cancels this short-circuit and instead monitors lead 27 for a voltage signal. A voltage sigal only occurs when additional charges are generated on electrodes 29 and 30 by piezoelectric disk 26 due to an increase or a diminution of the load. In this instance in this preferred embodiment switch 21 is immediately closed, wherewith a new measurement and assumption of the new measured value into display 19 are initiated. Piezoelectric disk 26 naturally does not react as sensitively as the balance itself, so that in this manner only large changes in load should be detected. However, experience has shown that normally even rather small changes in load are detected by means of the jolt at contact.

The invention was described above using the example of a balance with parallel guide and translation lever. It can of course also be used in balances without translation lever in which the compensation force directly acts on scale carrier 2. In this instance the stops for limiting the travel must cooperate directly with scale carrier 2. It is of course also possible in the balance shown with translation lever 7 for the travel-limiting stops to cooperate with scale carrier 2 instead of with translation lever 7. In addition, the invention can of course also be used in a platform balance.

Store 20 is sketched as a separate construction unit in FIG. 1 for the sake of clarity. This store can of course also be formed by a part of the RAM of microprocessor 18'.

We claim:

1. Balance based on the principle of the electro-magnetic compensation of force having a balance scale, and a scale carrier which can move vertically, by means of moveable parts and is connected to a support part integral with the housing, the balance is further provided with stops limiting the movement of the balance scale carrier in a vertical direction, a permanent magnet having a current-carrying coil which is located in the air gap of the permanent magnet generating a weight-proportional counterforce, a control circuit regulates the current through the coil by a digital signal processing unit, characterized in that switching means (21) are provided which can interrupt the current flow through the coil (11) so that when the current flow is interrupted, movable parts (2-9) of the balance move against one of the stops (24 or 25), the switching means (21) are controlled by the digital signal processing unit (18) and a storage means (20) is provided within the framework of the digital signal processing unit (18) which stores the last-determined weight value for the duration of the interruption of the current flow through the coil (11), the pulse-duty factor, that is, the time of the current flow through the coil in relation to the time in which the current flow through the coil is interrupted, is less than one.

2. Balance according to claim 1, characterized in that the pulse-duty factor is approximately 0.1.

3. Balance according to claim 1 characterized in that the pulse-duty factor is controlled by the digital signal processing unit (18) as a function of the load.

4. Balance according to claim 1 characterized in that a temperature sensor (31) in thermal contact with the coil (11) or with the permanet magnet (10) is provided and that the pulse-duty factor is regulated by the digital signal processing unit (18) as a function of the output signal of this temperature sensor (31).

5. Balance according to either claim 1, 2, 3, or 4, characterized in that the duration of the current flow is approximately 1 second.

6. Balance according to either claim 1, 3, 4, or 5, characterized in that the digital signal processing unit (18) interrupts the current flow through the coil (11) as soon as it has determined the standstill of the balance from the measured results.

7. Balance according to either claim 1, 2, 3, or 4, characterized in that the distribution of mass of the movable parts (2-9) of the balance is selected so that when the current flow through the coil (11) is interrupted, the movable parts (2-19) always contact the same stop (25) independently of the load present on the balance scale (3).

8. Balance according to claim 7, characterized in that the stop (25) is supported on the housing (1) via a force-sensitive element (26).

* * * * *